United States Patent [19]

Henseli

[11] Patent Number: 5,044,746
[45] Date of Patent: Sep. 3, 1991

[54] APPARATUS FOR MEASUREMENT OF WHEEL ALIGNMENT DATA

[75] Inventor: Karl-Heinz Henseli, Neufahrn, Fed. Rep. of Germany

[73] Assignee: A. Rohe GmbH, Schoellkrippen, Fed. Rep. of Germany

[21] Appl. No.: 479,609

[22] Filed: Feb. 13, 1990

[30] Foreign Application Priority Data

Feb. 15, 1989 [DE] Fed. Rep. of Germany ....... 3904557

[51] Int. Cl.$^5$ .......................................... G01B 11/275
[52] U.S. Cl. .................................................. 356/155
[58] Field of Search ................ 356/155, 152, 153, 121

[56] References Cited

U.S. PATENT DOCUMENTS 3,951,550  4/1976  Slick ..................................... 356/155
4,690,557  9/1987  Wiklund .............................. 356/155

FOREIGN PATENT DOCUMENTS 3523040  1/1986  Fed. Rep. of Germany .

Primary Examiner—Samuel Turner
Attorney, Agent, or Firm—Fleit, Jacobson, Cohn, Price, Holman & Stern

[57] ABSTRACT

A wheel alignment measurement apparatus comprises six identical measuring heads to be arranged on the wheels of the vehicle and evaluation means. Four measuring heads are mounted at the four wheels of the vehicle. Two additional measuring heads are mounted on the measuring heads of the front wheels by means of rigid bars so as to be disposed in front of the vehicle. Each measuring head includes (a) a structure for detecting vertical angles in the form of a pendulum structure suspended freely movable about an axle and including a radiation source 6 emitting a vertical beam, (b) a structure for detecting horizontal angles including an outside radiation source arranged in the facing measuring head and emitting a horizontal beam, and (c) only one sensor line 9 in the area of intersection of the horizontal and vertical beams for contact-free detection of horizontal and vertical angles. An evaluation unit calculates the alignment data from the outputs of the sensor lines.

18 Claims, 5 Drawing Sheets 5,044,746

APPARATUS FOR MEASUREMENT OF WHEEL ALIGNMENT DATA

BACKGROUND OF THE INVENTION

The present invention relates to a wheel alignment measurement apparatus for measuring in particular the alignment data of wheels of a 4-wheel vehicle by means of measuring heads and evaluation means.

From the German Patent 29 34 411 a wheel alignment measurement apparatus is known. Therein six angle measurement instruments are used of which one instrument is arranged at each wheel of a 4-wheel vehicle and two further instruments are mounted on the ends of support arms, such support arm being fixed to the front wheels and protruding beyond the front wheels in direction of travel of the vehicle. Through a calculation circuitry the angles measured by means of the angle measurement instruments can be evaluated to that extent that the individual track of the wheels and the total track of the front and rear wheels, respectively, can be found. Said German patent discloses no means for determining the inclination of the wheels and thus for determining the camber, castor and king pin inclination of the wheels of a 4-wheel vehicle.

From the German disclosure letter 35 31 459 a wheel alignment measurement apparatus and a wheel alignment measuring method for vehicles are known, in which the required data for an adjustment and/or alignment system, respectively, for vehicle wheels are delivered by a plurality of measuring heads mounted on the vehicle wheels, providing wheel data and being of such construction that they may be arranged at the vehicle wheels in a predetermined correlation with respect to the wheels. Said German disclosure letter discloses a measuring head comprising an infra-red transmitter and/or receiver, respectively, for measuring horizontal angles, the receiver consisting of a diode line of twenty to thirty diodes. Thus, the measuring heads mounted on the wheels can be optically correlated with one another and the data required for detecting the track values can be found. For simultaneously finding the values of inclination of the wheels common inclination measurement instruments are comprised in the measuring heads and all data are evaluated in a central processing unit. With this apparatus all wheel alignment data can be found. It is, however, necessary to effect an evaluation of different sensors, this resulting in a complex control and evaluation by the central processing unit and causing cumbersome installment and adjustment operations. Due to the use of different sensors also different error sources will be present and—as well—different constructions of the measuring heads for the respective wheels will be required and, thus, this will result in an overall uneconomical kind of construction.

SUMMARY OF THE INVENTION

It is the main object of the present invention to create a wheel alignment measurement apparatus which can be used in compliance with practice, i.e. which is of simple construction and can be easily installed and adjusted, and by means of which all wheel alignment data including horizontal as well as in vertical angles can be found.

This object is achieved in a wheel alignment measurement apparatus for measuring wheel alignment data which apparatus comprises measuring heads mounted on vehicle wheels, each of the measuring heads comprising a means for detecting vertical angles and a means for detecting horizontal angles, and comprising evaluation means evaluating the wheel alignment data from the detected vertical and horizontal angles, wherein the means for detecting the vertical angles comprises a pendulum structure suspended in a manner allowing free movement about a horizontal axis and including a radiation source with a vertical beam and a sensor line for the vertical beam, the means for detecting the horizontal angles comprises an outside radiation source disposed outside of the measuring head and emitting a horizontal beam, and a sensor line for the horizontal beam, and both sensor lines are combined into one sensor line located in the area of intersection of the horizontal beam and the vertical beams for contact-free detection of horizontal and vertical angles.

By combining the two sensor lines into one, the number of sensor lines needed in a wheel alignment measurement apparatus is cut in half, whereby the bulk is reduced and the number of sources of possible errors is also reduced accordingly.

In a preferred embodiment of the invention, the horizontal and vertical beams are focussed onto the sensor line, whereby the response of one particular sensor in the sensor line onto which the beam is focussed is improved, since the difference in the output of the sensor element receiving the focussed beam and the sensor element next to the afore-mentioned element is more pronounded.

According to a preferred embodiment of the invention, the horizontal and vertical beams are focussed onto the sensor line by a cylindrical lens means. The cylindrical lens means produces a line mark on the sensor line whereby the radiation impinging on the sensor element is distributed across its surface which has an effect on the usable life-span of the sensor element. Furthermore, the arrangement of the pendulum structure with respect to the incident horizontal beams can be selected more freely, as will be discussed below.

In a preferred embodiment of the invention, the horizontal axle of the pendulum structure is parallel to the direction of the horizontal beams whereby a plane defined by the vertical beams is substantially perpendicular to the direction of the horizontal beams. In this embodiment it is preferred that the sensor line is inclined at an angle of 45° with respect to the direction of the incident horizontal and vertical beams. It is an advantage of this embodiment that the horizontal and vertical beams fully impinge on the sensor line even in case of comparatively large angle measurements.

According to another preferred embodiment of the invention the horizontal axle of the pendulum structure is perpendicular to the direction of the horizontal beams whereby a plane defined by the vertical beams is substantially parallel to the direction of the horizontal beams. In this case it is preferred that the sensor line is inclined at an angle of 45° with respect to both the incident horizontal and vertical beams and is arranged at an angle of 45° with respect to each of the planes defined by the horizontal and vertical beams.

A further embodiment of the invention comprises deflecting means for deflecting at least one of the horizontal or vertical beams impinging on the sensor line in such a way that both beams are in the same plane and in the same direction when impinging on the sensor line. In this case it is preferred that the sensor line is disposed in the plane of impingement of the beams and is perpendicular to the direction of the beams. In this embodiment one of the beams is rerouted in such a manner that the sensor line need not be inclined with respect to the incident beams which improves the well-defined shape of the beam spot or beam line incident on the sensor elements of the sensor line.

The radiation sources preferably emit optically variable radiation, most preferably radiation in the infra-red range. In such a case, the sensor lines may be embodied by various sensors like CCT devices, optical/analogue sensors for angle detection, or photosensitive elements.

In a preferred embodiment of the invention optical filter means for suppressing environmental disturbances are disposed in front of the sensor line. The optical filter means assure that no light from outside of a measuring head impinges on the sensor line and interferes with the measurement.

In a preferred embodiment of the invention the evaluation means is an electronical central processing unit comprising a memory for storing measuring reference values. The evaluation means may also comprise control means which are provided for activating one radiation source at a time and for reading an output of a sensor line related to the activated radiation souce. This assures that the output of a particular sensor line produced by the horizontal beams does not interfere with the output of the same sensor line for the vertical beam when the horizontal beam and the vertical beam are not activated at the same time but subsequently.

A preferred embodiment of the invention comprises
one measuring head disposed at each vehicle wheel in such a way that the horizontal beam radiation sources of two measuring heads located on one side of the vehicle are facing one another and that the horizontal beams are directed from one measuring head to the other, and an additional measuring head fixed by means of rigid bars to each of the measuring heads disposed at the front wheels in such way that the horizontal beam radiation sources of the additional measuring heads are facing one another and that the horizontal beams of the additional measuring heads are directed from one additional measuring head to the other.

For finding the wheel alignment data in 4-wheel vehicles six measuring heads of the above-described kind are installed in such way that one measuring head is located at each of the wheels and a further measuring head by means of a rigid bar is fixed to each of the measuring heads located at the front wheels. The measuring heads are aligned such that all means for detecting vertical angles can be operated uninhibited, i.e. that all pendulum axes are located at the top sides of the measuring heads. Furthermore, the measuring heads located on one and the same side of the vehicle at the respective front and rear wheels are mutually aligned in such way that the horizontal radiation source of the one measuring head can send radiation though the respective reception opening of the other measuring head and vice versa. The two measuring heads which are by means of rigid bars fixed to the measuring heads mounted at the front wheels are aligned such that also their horizontal radiation sources and measuring openings are mutually facing. The rigid bars extend beyond the front edge of the vehicle and the two additional measuring heads have optical connection in front of the vehicle.

In the afore-mentioned embodiment it is preferred that the horizontal beam radiation sources and the sensor lines are active in a horizontal measuring plane whereby the horizontal angles detected by the sensor lines are evaluated for obtaining track data, and a pair of a vertical beam radiation source and a sensor line is active in a vertical measuring plane whereby vertical angles in the vertical measuring planes detected by the sensor lines of the additional measuring heads are evaluated for obtaining king pin inclination values of the front wheels, vertical angles in the vertical measuring planes of the measuring heads located at the front wheels are evaluated for obtaining camber and castor values of the front wheels and vertical angles in the vertical measuring planes of the measuring heads located at the rear wheels are evaluated for obtaining camber values of the rear wheels.

In other words, the evaluation of the measured values of the horizontal measuring plane serve for finding the track of the wheels, the evaluation of the measured values in the vertical measuring planes serve for finding the individual wheel inclinations, i.e. of the camber and indirectly of the castor and the king pin inclination.

The connection between the measuring heads and the evaluation means may be installed in common manner by means of lines. Said connection may also be established in contact-free manner, e.g. optically or by means of wireless radio connection.

LIST OF FIGURES

Further advantageous embodiments of the present invention can be seen from the following description referring to the enclosed drawings. In the drawings.

DETAILED ACCOUNT OF WORKING EXAMPLE OF THE INVENTION

Figure 1:
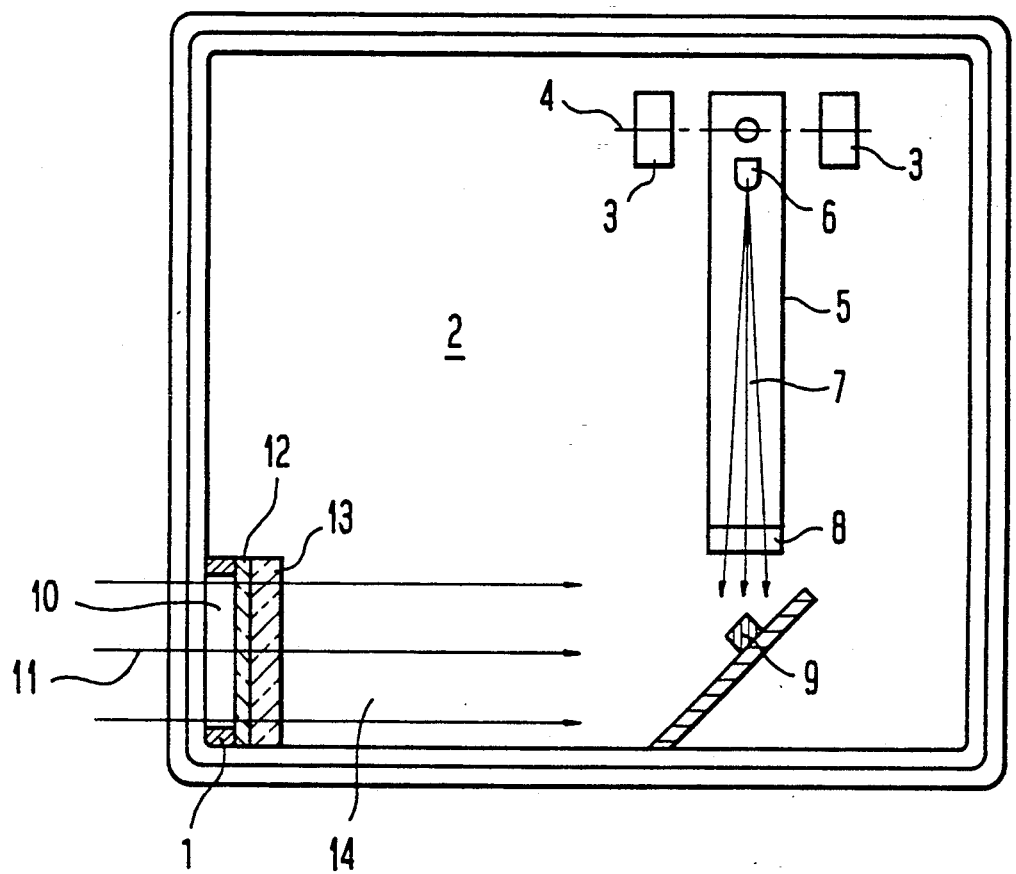
FIG. 1 is a cut side view of a measuring head of an apparatus according to the present invention.

The measuring head shown in FIG. 1 comprises a housing 1 having a rear wall 2. Two axle supports 3 are fixed to said rear wall 2 and extend perpendicularly thereto, protruding out of the picture plane of FIG. 1. The axle supports 3 support an axle 4 being loCated therebetween. A pendulum structure 5 is fixed to the axle 4. A radiation source 6 is arranged in the pendulum structure 5, which radiation source emits a vertical beam 7 directed vertically downwards of the axle 4. At the bottom of the pendulum structure 5 a lens 8 is arranged which serves for focussing the vertical beam 7 onto a sensor line 9. The lens 8 may be a lens producing a dot-shaped image of the radiation source on the sensor line. The lens 8 is, however, preferably a cylindrical lens producing a line mark on the sensor line. The sensor line 9 is disposed perpendicularly to the axle 4 and perpendicularly to the picture plane of FIG. 1. In case of said radiation source 6 being switched on, the angle of rotation of the pendulum 5 about the axle 4 or the vertical angle may be evaluated from the output of the sensor line 9.

The housing 1 has an opening 10 through which a horizontal radiation beam 11 may enter the housing 1 of the measuring head. By means of a filter 12 detrimental environmental influences may be eliminated to a very high degree. The horizontal beam 11 is focussed by means of a lens 13 in such way that a focussed beam 14 results. The lens 13 may be a cylindrical lens.

Figure 2:
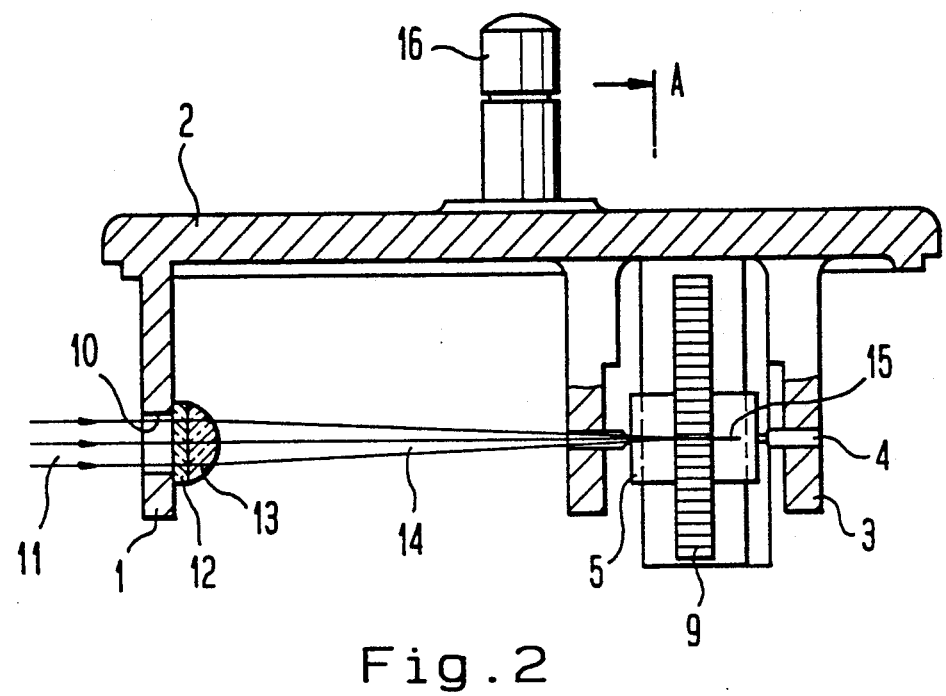
FIG. 2 is a cut top view on the measuring head.

As can be seen from FIG. 2, axle 4 of the pendulum structure 5 is disposed in the direction of the focussed beam 14. As the pendulum moves, the vertical beams 7 define a plane which is substantially perpendicular to the direction of the focussed beam 14 resulting from the horizontal beam 11. As the incident angle of the beam 11 is changed, the beams 14 define a plane which also is perpendicular to the plane defined by the vertical beams 7. In order to be impiniged by the vertical beams 7 and the horizontal beams 11 or the focussed beams 14, respectively, as well, the sensor line 9 is inclined by 45° with respect to both the direction of beams 14 and beams 7. Therefore, when only the vertical or the horizontal beams impinge on the sensor line 9, only the vertical or horizontal angles can be determined by reading the outputs of the sensor line. Since the axle 4 is perpendicular to the longitudinal direction of the sensor line 9, the pendulum structure 5 can be deviated by a comparatively large amount to both sides of its zero position (zero angle) while the vertical beams 7 still impinge on the sensor line.

As can be seen from FIG. 2, the horizontal beam 11 enters interior of the measuring head through the opening 10 in the housing 1. The beam 11 passes the filter 12 and the lens 13 and is focussed to form said measuring line bundle 14. Thus, on said sensor line 9 a line mark 15 is formed from which a horizontal angle may be evaluated. A mouting pin 16 is located at the rear wall 2 of the housing of the measuring head.

Figure 3:
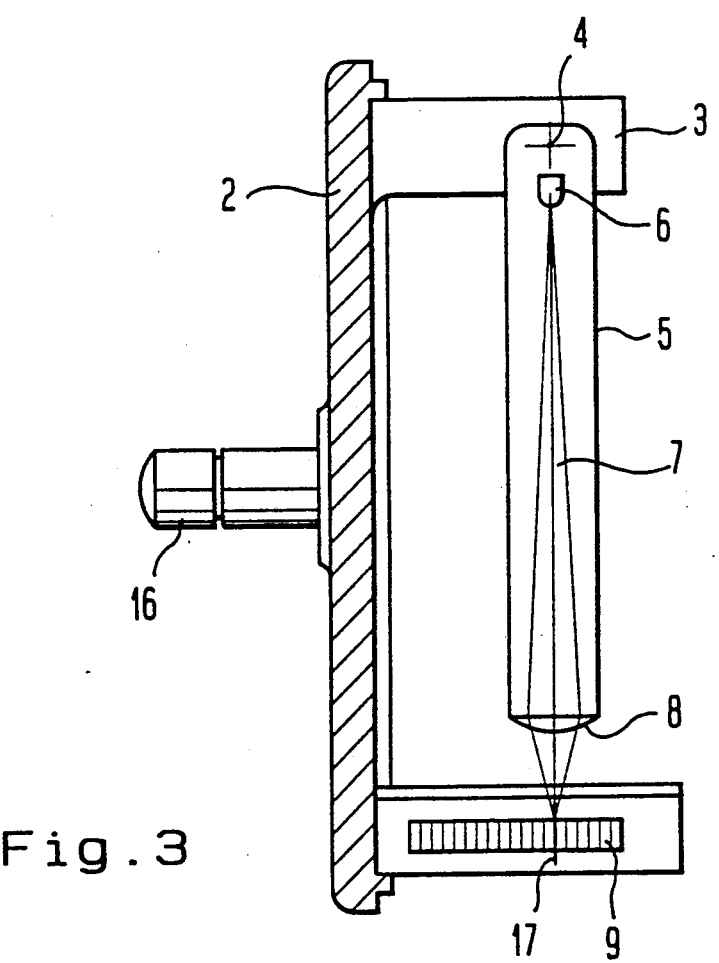
FIG. 3 is a further cut view of the measuring head of FIG. 2 cut in position A.

As can be seen from FIG. 3, i.e. FIG. 2 cut in position A, the radiation source 6 disposed in the pendulum structure 5 being suspended as pendulum issues said vertical radiation bundle 7 which is focussed by said lens 8 in such way that a line mark 17 is formed on the sensor line 9. The vertical angle may be evaluated from the position of the line mark 17 on the sensor line 9.

Figure 4:
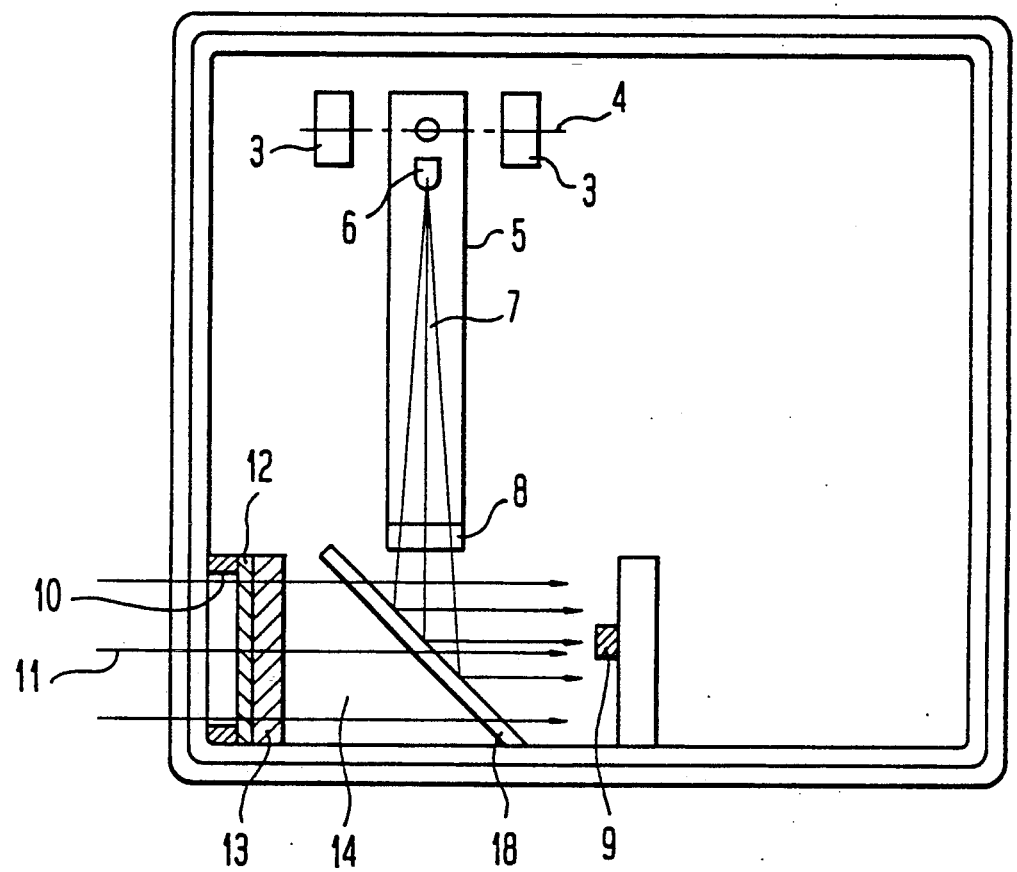
FIG. 4 is a cut side view of a further embodiment of the measuring head of an apparatus according to the present invention.

In the embodiment shown in FIG. 4 the horizontal beam 11 enters through the opening 10, the optical filter 12, the lens 13 and penetrates through a semipermeable mirror 18. The vertical beam 7 emitted by the radiation source 6 disposed in the pendulum structure 5, is deflected by the mirror 18 such that the deflected beam is in parallel to the focussed beam 14. As both radiation beams 7 and 14 impinge on the sensor line 9 from the same direction, the sensor line 9 may be arranged perpendicularly to the picture plane of FIG. 1 and perpendicularly to the direction of the focussed beam 14.

Figure 5:
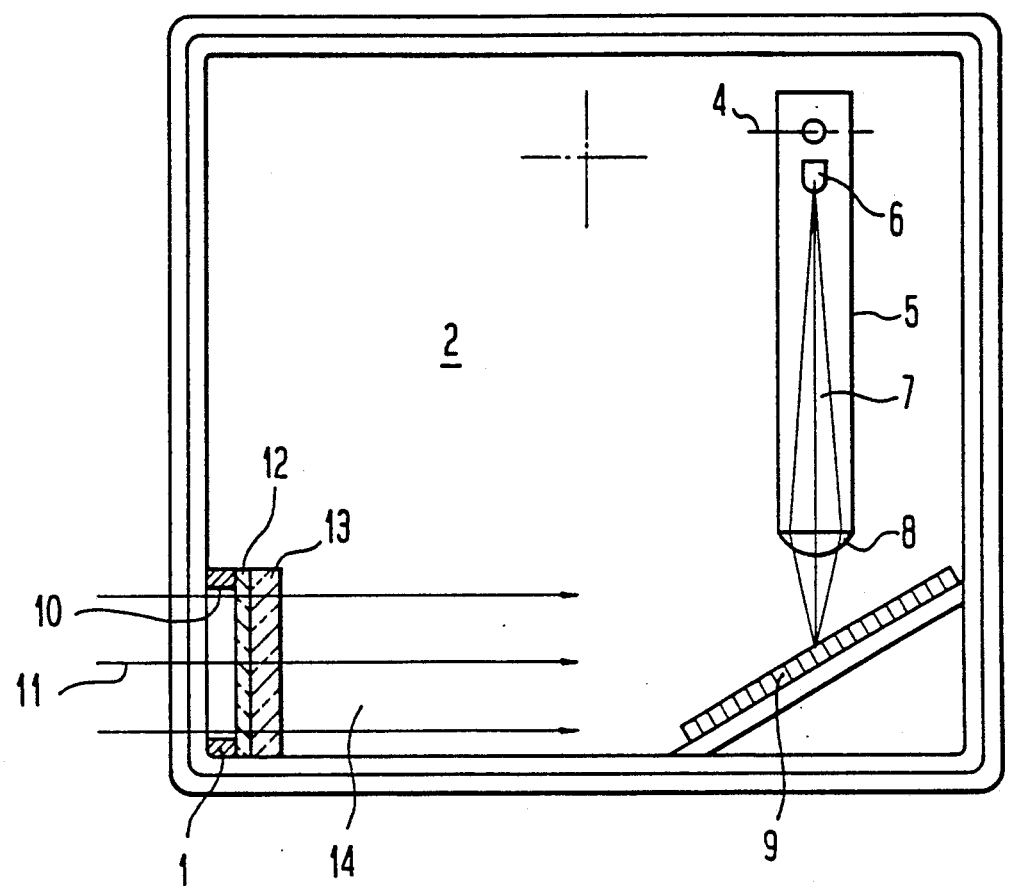
FIG. 5 is a cut side view of a further embodiment of the measuring head.
Figure 6:
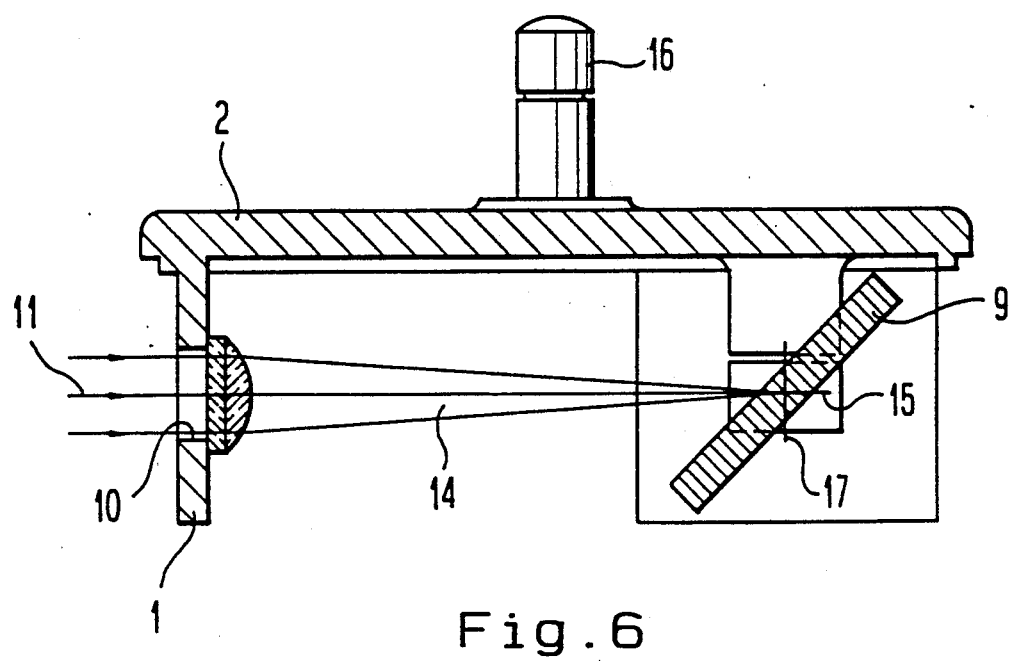
FIG. 6 is a cut top view on the measuring head of FIG. 5.

FIG. 5 shows an embodiment of a measuring head in which the horizontal beam 11 and the axle 4 of the pendulum structure 5 are perpendicular with respect to one another. This means that said axle 4 is perpendicular to the picture plane of FIG. 5. Said radiation source 6 located in pendulum structure 5 emits the vertical beam 7 which is focussed by said lens 8. The horizontal beam 11 enters the measuring head through the opening 10 in the housing 1, passes through the filter 12 and the lens 13 and thus is focussed to form the focussed beam 14. The vertical beam 7 and the horizontal beam 14 are perpendicular with respect to one another and furthermore are located in planes being perpendicular with respect to one another. Therefore, the sensor line 9 has to be inclined by 45° with respect to each radiation direction, and additionally it has to be rotated by 45°, as is shown in FIG. 6. Thus it is possible to evaluate the horizontal angle by means of the measuring mark 15 of the horizontal beam. In this arrangement it is possible to measure the horizontal angle by means of the line mark 15 of the focussed beam 14 and the vertical angle by means of the line mark 17 of the vertical beam 7.

Figure 7:
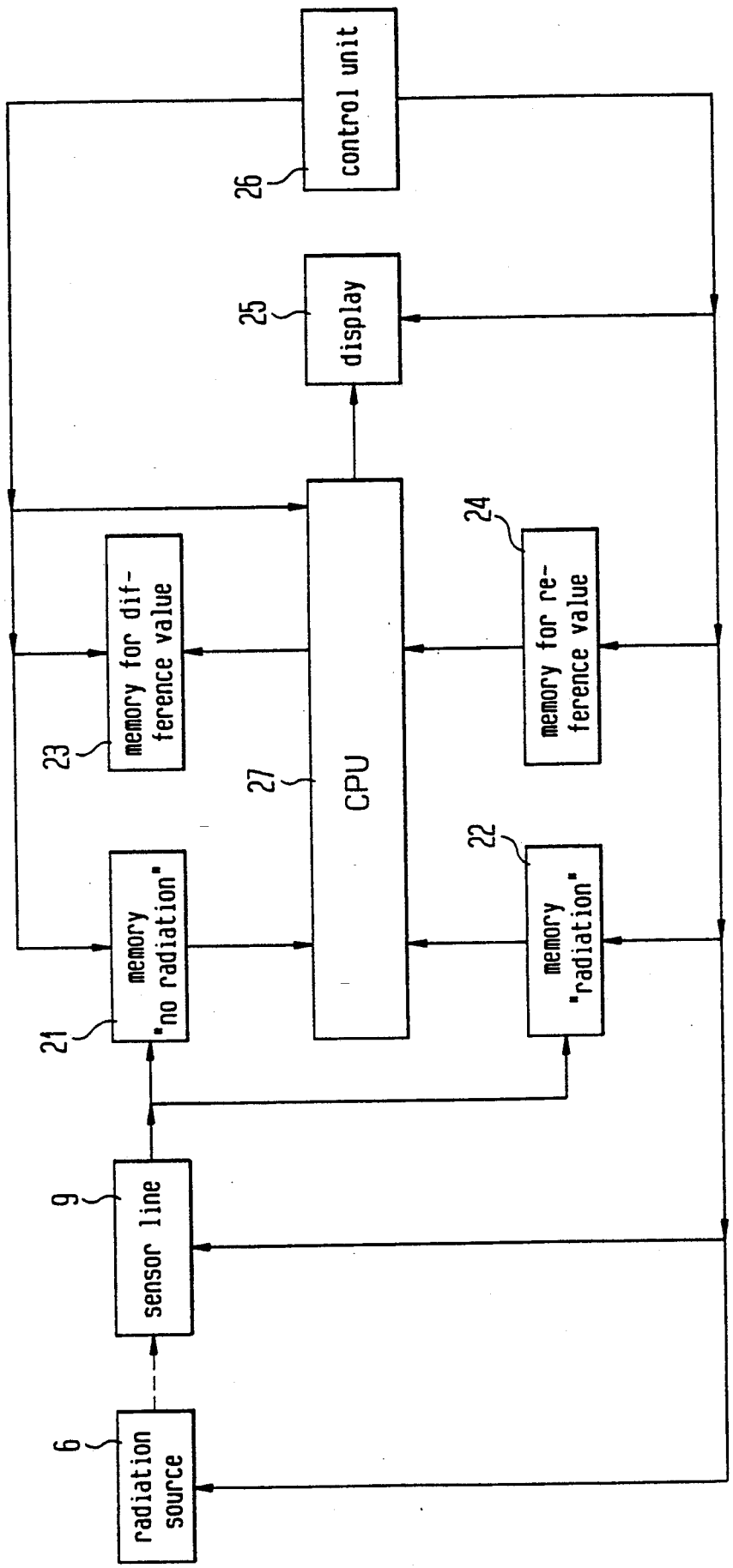
FIG. 7 is a blockdiagram of an embodiment of an evaluation means.

The radiation source 6 and the sensor line 9 belonging thereto are activated by a control unit 26 with the aid of an evaluation means according to the block diagram in FIG. 7. At first the control unit 26 activates the sensor line 9 only and stores the received measurement value in a memory 21. Now said control unit 26 also activates the radiation source 6 and stores the received measurement value in a memory 22. Now the received measurement value in the memory 22 may be corrected by means of a central processing unit 27 by the correction value from said memory 21. In a reference memory 24 reference values having been set once are stored. The difference between the value in memory 22 corrected by the value in memory 21 and the reference value in memory 24 created in said central processing unit 27 may now be directly fed to a display 25 or presently be stored in a memory 23 for the difference values. These operations are controlled by the control unit 26.

What is claimed:

1. A wheel alignment measurement apparatus for measuring wheel alignment data, said apparatus comprising measuring heads mounted on vehicle wheels, each of said measuring heads comprising a means for detecting vertical angles for evaluating camber, castor and king pin inclination and a means for detecting horizontal angles for evaluating track angles, and comprising evaluation means for evaluating said wheel alignment data from said detected vertical and horizontal angles, wherein said means for detecting said vertical angles comprises a pendulum structure suspended in a manner allowing free movement about a horizontal axle in a vertical plane and including a radiation source with a vertical beam and a sensor line for said vertical beam, said means for detecting said horizontal angles comprises an outside radiation source disposed outside of said measuring head and emitting a horizontal beam in a horizontal plane, and a sensor line for said horizontal beam, and both sensor lines are combined into one sensor line located in an area of intersection of said horizontal plane and said vertical plane for contact-free detection of horizontal and vertical angles.

2. Apparatus as defined in claim 1, wherein said horizontal beam and said vertical beam are focussed onto said sensor line.

3. Apparatus as defined in claim 1, wherein said horizontal beam and said vertical beam are focussed by a cylindrical lens means on said sensor line.

4. Apparatus as defined in claim 1, wherein the horizontal axle of said pendulum structure is parallel to the direction of the horizontal beam whereby said vertical plane in which the pendulum structure is movable is substantially perpendicular to the direction of said horizontal beam.

5. Apparatus as defined in claim 4, wherein said sensor line is inclined at an angle of 45° with respect to said horizontal plane and with respect to said vertical plane.

6. Apparatus as defined in claim 1, wherein said horizontal axle of said pendulum structure is perpendicular to the direction of the horizontal beam whereby said vertical plane in which the pendulum structure is movable is substantially parallel to the direction of the horizontal beam.

7. Apparatus as defined in claim 6, wherein said sensor line is inclined at an angle of 45° with respect to both said horizontal plane and said vertical plane and extends at an angle of 45° with respect to the planes defined by the horizontal and vertical beams.

8. Apparatus as defined in claim 1, comprising deflecting means for deflecting said horizontal beam or said vertical beam impinging on said sensor line in such way that both beams are in the same plane and in the same direction when impinging on said sensor line.

9. Apparatus as defined in claim 8, wherein said sensor line is disposed in the plane of impingement of the beams and perpendicularly to the direction of the beams.

10. Apparatus as defined in claim 1, wherein said radiation sources emit optically evaluable radiation in the infrared range.

11. Apparatus as defined in claim 1, wherein said sensor line is a CCD line.

12. Apparatus as defined in claim 1, wherein said sensor line is an optical analogue sensor for angle detection.

13. Apparatus as defined in claim 1, wherein said sensor line is a line of photosensitive elements.

14. Apparatus as defined in claim 1, wherein optical filter means for suppressing environmental disturbances are disposed in front of said sensor line.

15. Apparatus as defined in claim 1, wherein said evaluation means is an electronical central processing unit comprising a memory for storing measurement reference values.

16. Apparatus as defined in claim 1, comprising control means in said evaluation means, which control means are for activating one radiation source at a time and for reading an output of a sensor line related to the activated radiation source.

17. Apparatus as defined in claim 1, wherein one measuring head is disposed at each vehicle wheel in such a way that the horizontal beam radiation source of each of the two measuring heads located at the front wheel and at the rear wheel on one side of the vehicle are facing one another and that the horizontal beam of one measuring head is directed to the other measuring head, and wherein an additional measuring head is fixed by means of a rigid bar to each of the measuring heads disposed at the front wheels in such a way that the horizontal beam radiation sources of each of said additional measuring heads are facing one another and that the horizontal beam of one of said additional measuring heads is directed to the other of said additional measuring heads.

18. Apparatus as defined in claim 17 wherein all horizontal beams of said beam radiation sources of said measuring heads and said sensor lines of said measuring heads are active in said horizontal plane whereby the horizontal angles detected by said sensor lines are evaluated for obtaining track data, and wherein a vertical beam radiation source and a sensor line of one measuring head are active in one or the other of two which are mutually perpendicular to each other vertical planes, whereby said vertical angles detected by said sensor lines of said additional measuring heads are evaluated for obtaining king pin inclination values of the front wheels, said vertical angles of said measuring heads located at the front wheels are evaluated for obtaining camber and castor values of the front wheels, and said vertical angles of said measuring heads located at the rear wheels are evaluated for obtaining camber value of the rear wheels.

* * * * *